(12) United States Patent
Karmarkar et al.

(10) Patent No.: US 8,988,350 B2
(45) Date of Patent: Mar. 24, 2015

(54) METHOD AND SYSTEM OF USER AUTHENTICATION WITH BIORESPONSE DATA

(75) Inventors: Amit Karmarkar, Palo Alto, CA (US); Richard Ross Peters, Mill Valley, CA (US)

(73) Assignee: Buckyball Mobile, Inc, Palo Alto, CA (US)

( * ) Notice: Subject to any disclaimer, the term of this patent is extended or adjusted under 35 U.S.C. 154(b) by 23 days.

(21) Appl. No.: 13/589,304

(22) Filed: Aug. 20, 2012

(65) Prior Publication Data

US 2013/0044055 A1 Feb. 21, 2013

Related U.S. Application Data

(60) Provisional application No. 61/525,748, filed on Aug. 20, 2011, provisional application No. 61/672,415, filed on Jul. 17, 2012.

(51) Int. Cl.
| | |
|---|---|
| *G06F 3/0346* | (2013.01) |
| *G06F 3/01* | (2006.01) |
| *G06F 21/31* | (2013.01) |
| *G06F 21/32* | (2013.01) |

(52) U.S. Cl.
CPC .............. *G06F 3/013* (2013.01); *G06F 21/316* (2013.01); *G06F 21/32* (2013.01); *G06F 2221/2133* (2013.01)

USPC ........................................................ 345/158

(58) Field of Classification Search
CPC ...................................................... G06F 3/033
USPC ........................................................ 345/158
See application file for complete search history.

(56) References Cited

U.S. PATENT DOCUMENTS

| | | | |
|---|---|---|---|
| 8,594,374 B1 * | 11/2013 | Bozarth ........................ 382/103 |
| 2005/0270386 A1 * | 12/2005 | Saitoh et al. .................. 348/239 |
| 2008/0065468 A1 * | 3/2008 | Berg et al. ........................ 705/10 |
| 2010/0077210 A1 * | 3/2010 | Broder et al. ................. 713/168 |
| 2011/0158558 A1 * | 6/2011 | Zhao et al. .................... 382/305 |
| 2011/0213664 A1 * | 9/2011 | Osterhout et al. .......... 705/14.58 |

* cited by examiner

*Primary Examiner* — William Boddie
*Assistant Examiner* — Towfiq Elahi

(57) ABSTRACT

In one exemplary embodiment, a computer-implemented method includes the step of providing an image to a user. The image is provided with a computer display, An eye-tracking data is obtained from the user when the user views the image. The eye-tracking data is obtained with an eye-tracking system. A user attribute is determined based on the eye-tracking data. The user is enabled to access a digital resource when the user attribute is associated with a permission to access the digital resource. The user attribute can be a personhood state. The digital resource can be a web page document. An instruction can be provided to the user regarding a pattern of viewing the image. The pattern of viewing the image can include instructing the user to gaze on a specified sequence of image elements.

5 Claims, 11 Drawing Sheets

PLEASE ANSWER THE
AUTHENTICATION TEST
QUESTION

WHAT IS THE SEATED WOMAN
DOING?

TEXT INSTRUCTIONS FOR AUTHENTICATION TEST 704

MOBILE DEVICE 700

METHOD AND SYSTEM OF USER AUTHENTICATION WITH BIORESPONSE DATA

CROSS-REFERENCE TO RELATED APPLICATIONS

This application claims priority from pending provisional U.S. Application No. 61/525,748, titled AUTHENTICATION OF USER WITH EYE-TRACKING DATA, and filed Aug. 20, 2011 and pending provisional U.S. Application No. 61/672,415, titled A METHOD AND SYSTEM OF CHALLENGE-RESPONSE AUTHENTICATION WITH EYE-TRACKING DATA, and filed Jul. 17, 2012. These applications are hereby incorporated by reference in their entirety for all purposes.

BACKGROUND OF THE INVENTION

1. Field

This application relates generally to human-computer interaction, and more particularly to a system and method of user authentication using bioresponse data.

2. Related Art

Eye-tracking data and/or other bioresponse data can be collected from a variety of devices and sensors that are becoming more and more prevalent today. Laptops frequently include microphones and high-resolution cameras capable of monitoring a person's facial expressions, eye movements, or verbal responses while viewing or experiencing media. Cellular telephones now include high-resolution cameras, proximity sensors, accelerometers, touch-sensitive screens in addition to microphones and buttons, and these "smartphones" have the capacity to expand the hardware to include additional sensors. Moreover, high-resolution cameras are decreasing in cost making them prolific in a variety of applications ranging from user devices like laptops and cell phones to interactive advertisements in shopping malls that respond to mail patrons' proximity and facial expressions. The capacity to collect eye-tracking data and other bioresponse data from people interacting with digital devices is thus increasing dramatically.

At the same time, many website administrators try to prevent unwanted internet bots from accessing websites. Various types of challenge-response tests are used to ensure that the response is generated by a person and not an internet hot. The process can involve a computer asking a user to complete a simple test which the computer is able to grade. The test can be designed to be easy for a computer to generate, but difficult for a computer to solve; such that if a correct solution is received, it can be presumed to have been entered by a human. A common type of challenge-response is the CAPTCHA. A CAPTCHA can require a user to type letters or digits from a distorted image that appears on the screen. However, many internet bots have already been written that can solve various forms of CAPTCHA tests. Thus, a method and system are desired for using eye-tracking data in a challenge/response test to authenticate a human user.

BRIEF SUMMARY OF THE INVENTION

In one embodiment, a computer-implemented method includes providing an image to a user. The image is provided with a computer display. An eye-tracking data is obtained from the user when the user views the image. The eye-tracking data is obtained with an eye-tracking system. A user attribute is determined based on the eye-tracking data. The user is allowed to access a digital resource when the user attribute is associated with a permission to access the digital resource.

Optionally, the user attribute can be a personhood state. The digital resource can be a web page document. An instruction can be provided to the user regarding a pattern of viewing the image. The pattern of viewing the image can include instructing the user to gaze on a specified sequence of image elements.

In another embodiment, a method includes displaying a digital image with a computing device. A user is instructed to answer a query about the digital image. A user's eye-tracking data is received for a period that the user views die digital image. The user's eye-tracking data is compared with one or more baseline datasets. A file or a service is provided to the user when the user's eye-tracking data substantially matches the one or more baseline datasets. Optionally, a user's bioresponse data can be received for the period that the user views the digital image. The user's eye-tracking data and the user's bioresponse data can be compared with the one or more baseline datasets. The file or the service can be provided to the user when the user's eye-tracking data and the user's bioresponse data substantially matches the one or more baseline datasets.

BRIEF DESCRIPTION OF THE DRAWINGS

The present application can be best understood by reference to the following description taken in conjunction with the accompanying figures, in which like parts can be referred to by like numerals.

DETAILED DESCRIPTION OF THE INVENTION

Figure 1:
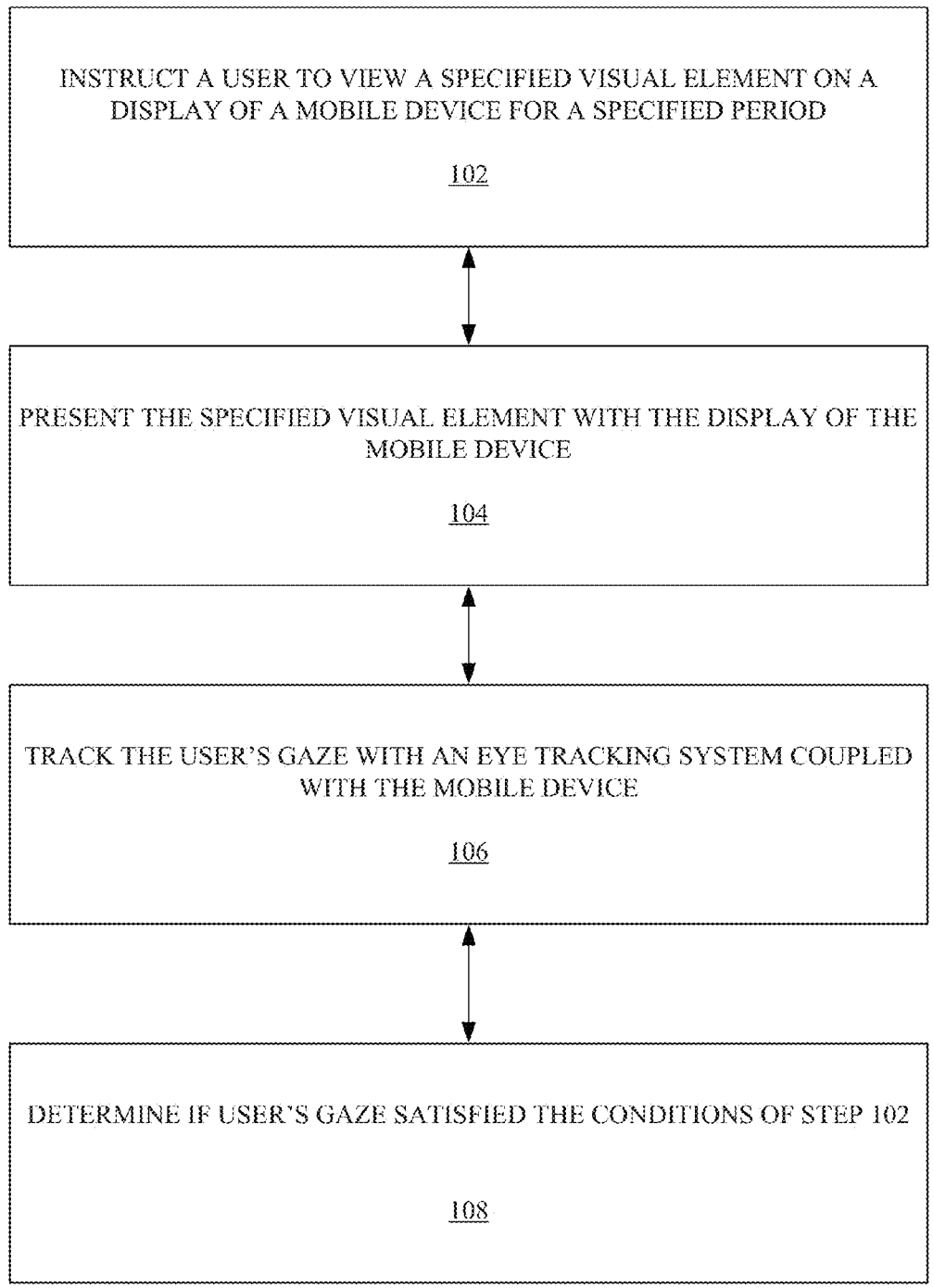
FIG. 1 illustrates an exemplary process for authenticating a user with eye-tracking data, according to some embodiments.

Disclosed are a system, method, and article of manufacture for user authentication with bioresponse data. The following description is presented to enable a person of ordinary skill in the art to make and use the various embodiments. Descriptions of specific devices, techniques, and applications are provided only as examples. Various modifications to the examples described herein can be used, and the general principles defined herein can be applied to other examples and applications without departing from the spirit and scope of the various embodiments. Thus, the various embodiments are not intended to be limited to the examples described herein and shown, but are to be accorded the scope consistent with the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification can, but do not necessarily, all refer to the same embodiment.

Furthermore, the described features, structures, or characteristics of the invention can be combined in any suitable manner in one or more embodiments. In the following description, numerous specific details are provided, such as examples of programming, software modules, attendee selections, network transactions, database queries, database structures, hardware modules, hardware circuits, hardware chips, etc., to provide a thorough understanding of embodiments of the invention. One skilled in the relevant art can recognize, however, that the invention can be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagrams, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or cannot strictly adhere to the order of the corresponding steps shown.

A. Exemplary Operations

Regarding FIGS. 1-3 and 6, for purposes of simplicity of explanation, the one or more methodologies shown herein, e.g., in the form of a flow chart, are shown and described as a series of acts, it is to be understood and appreciated that the subject innovation is not limited by the order of acts, as some acts can, in accordance with some embodiments, occur in a different order and/or concurrently with other acts from that shown and described herein. For example, a methodology could alternatively be represented as a series of interrelated states or events, such as in a state diagram. Moreover, not all illustrated acts can be required to implement a methodology in accordance with some embodiments.

Eye-tracking systems can indicate a coordinate location of a particular visual stimuli—like a particular word in a phrase or figure in an image—and associate the particular stimuli with a certain response. This association can enable a system to identify specific words, images, portions of audio and other elements that elicited a measurable biological response from the person experiencing the multimedia stimuli. For instance, a person reading a book can quickly read over some words while pausing at others. Quick eye movements, or saccades, can then be associated with the words the person was reading. When the eyes simultaneously pause and focus on a certain word for a longer duration than other words, this response can then be associated with the particular word the person was reading. This association of a particular word and bioresponse can then be analyzed.

Eye-tracking data can be used for a variety of purposes ranging from general research to improving viewer interaction with text, websites, or other multimedia information. In some instances, eye-tracking data can be used to monitor a reader's responses while reading text. The eye-tracking to the text can then be used to improve the reader's interaction with the text by, for example, providing definitions of words that the user appears to have trouble understanding.

Eye-tracking data can be collected from a variety of devices and eye-tracking systems such as those provided infra. For example, laptops can include high-resolution cameras capable of monitoring a person's facial expressions and/or eye movements while viewing or experiencing media. Cellular telephones can include high-resolution cameras, proximity sensors, accelerometers, and gyroscopes and these "smartphones" have the capacity to expand the hardware to include additional sensors.

FIG. 1 illustrates an exemplary process 100 for authenticating a user with eye-tracking data, according to some embodiments. In step 102 of process 100, a user of a mobile device can be instructed to view a specified visual element on a display of the mobile device for a specified period. For example, the visual element can be an image, design, shape, region of the display, pattern, color, figure and/or any combination thereof. In various examples, the visual element can be displayed as static and/or in motion at a specified velocity. The period can be any specified period appropriate for the context of the particular authentication test. For example, the user can be given a half second to find the visual element and then hold the gaze on the visual element for a second. In other examples, the user need only locate the visual element with a specified period. In yet another example, the user can need to locate a series of visual elements within a specified period. Some embodiments can include an instruction phase where an application displays the visual element and provides instructions (in the form of text, voice and the like) that indicate the various periods involved. In some examples, the user can select the visual element and/or input the various periods (e.g. with text input elements, radio buttons, drop down menus, etc.). Other authentication tests (e.g. passwords, facial recognition operations and the like) can be utilized to confirm the identity of the user before the instructions are provided. The particular authentication test can then be utilized for a certain period of time (e.g. a month, until the user requests a change, etc.) and/or a certain number of tests are performed. In step 104, the visual element can be presented to the user. In some examples, other types of visual elements can also be presented to the user in order to confuse potential other users that are not familiar with the required visual element. In step 106, the user's eye movement can be tracked with an eye-tracking system coupled with and/or integrated into the mobile device. In step 108, it is determined if the eye-tracking data obtained in step 106 satisfies the particular conditions provided in step 102. Additionally, in certain embodiments, the steps of process 100 can be performed in another order and/or multiple times. Furthermore, other authentication tests can be utilized in conjunction with process 100 to authenticate a user. Thus, in some embodiments, process 100 can be included in a multifactor authentication test. It is also noted, that in other examples, process 100 can be utilized in various types of computers such as personal computers, laptops, tablet computers, digital media computers couple with digital media presentation systems, digital billboards, digital kiosks, and the like.

Figure 2:
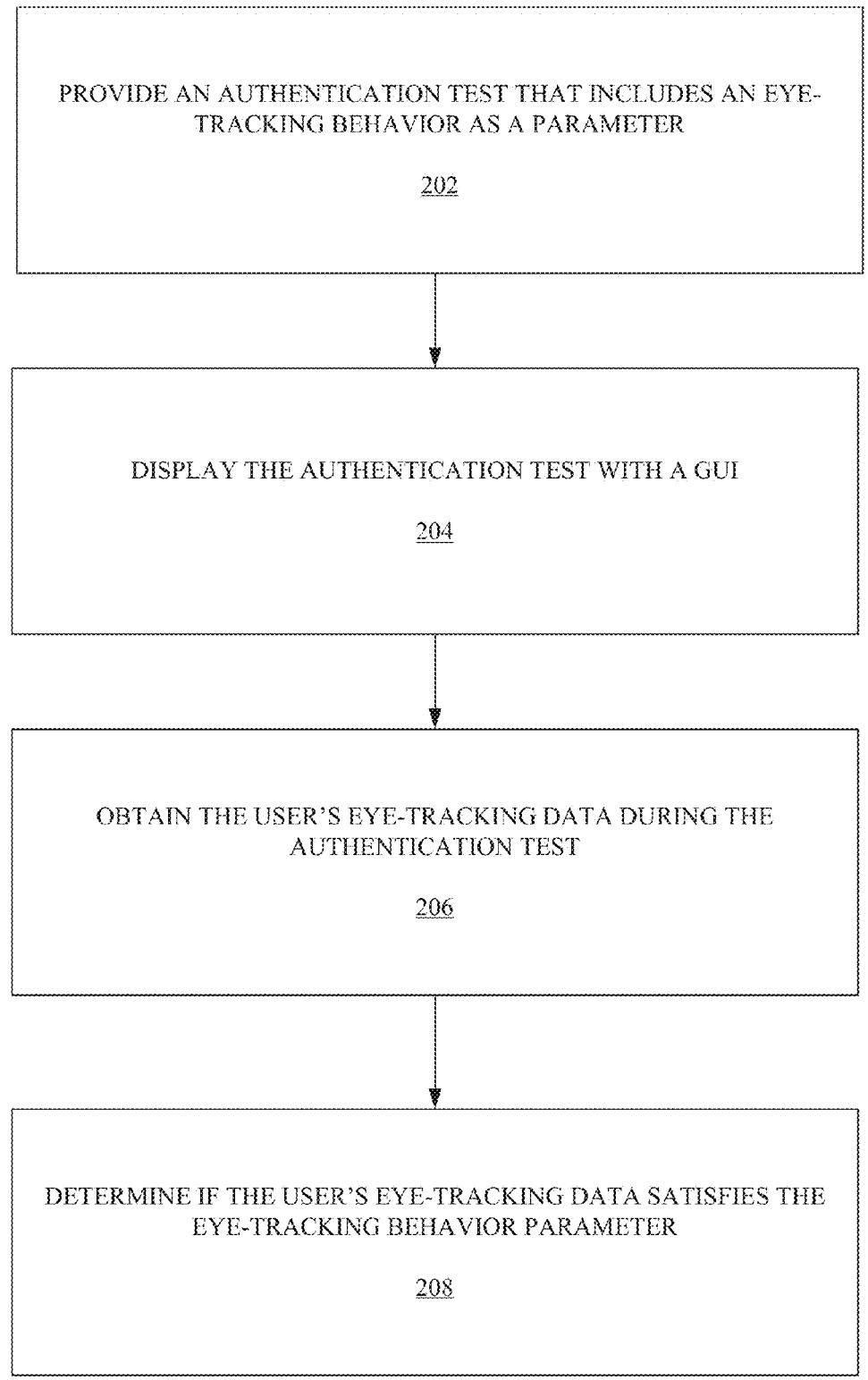
FIG. 2 illustrates another exemplary process for authenticating a user with eye-tracking data, according to some embodiments.

FIG. 2 illustrates another exemplary process 200 for authenticating a user with eye-tracking data, according to some embodiments. In step 202 of process 200, an authentication test is provided that includes eye-tracking behavior as a parameter. The eye-tracking behavior can include a gaze at a particular region of the display, a gaze at a particular location in a user's environment (e.g. when the user is wearing augmented reality glass and/or glass that include and/or are coupled with an eye-tracking system), a particular sequence of eye motions and the like. In a particular example, an image that is known or familiar to the user (e.g. retrieved from a user or friend's account in a social network or inferred from data in a user's profile and/or user's viewing history) is displayed along with other generic and/or unknown images, The user's eye-tracking behavior can indicate familiarity with the known image, Time limits can be included in the eye-tracking behavior parameter as well. In step 204, an authentication test is displayed with a GUI of a computer device with a display (e.g. a mobile device). The authentication test can include instructions to perform a preset action (e.g. look at a particular element, perform a certain gaze pattern with the user's eyes, etc.). In step 206, the user's eye-tracking data is obtained during the period of the authentication test. In step 208, it is determined if the user's eye-tracking data satisfies the eye-tracking behavior parameter (e.g. within a certain threshold of error, absolute match, etc).

It is noted that eye-tracking data can be represented in a variety of formats for comparison. Example representations of eye-tracking data that can be utilized include, inter alia, heat maps, representations of a point and/or trace on the interface, representations of the saccade path and/or blind zone maps. For example, a region can be required to be eighty-percent covered with a particular heat map color in order for a threshold to be satisfied. Data structures that include the values of heat-map representations can also be utilized.

It is further noted that, in some example embodiments, authentication test instructions can include various cultural, demographic and/or personal history factors. For example, an instruction can be "look at the person who is most relaxed", "look at the person from colonial America", "look at your Facebook® friend", and the like. In one example, a person can input personal information (e.g. personal preferences and/or associated images). These personal preferences can be utilized to generate a personalized authentication test content and/or authentication test instructions. For example, a person can pre-provide a list of favorite foods. The authentication test content can then provide various images of a food items with the authentication test instruction as "look at your favorite food item for two seconds".

Authentication test instructions can include other user tasks such as to look at a particular set of elements and/or locations in a specified sequence. Another example can include a negative authentication test instruction such as to avoid looking at a particular element and/or region of a computer display for a period of time while viewing the others freely. These examples are provided by way of instruction and not limitation.

Authentication tests can include various other types of user bioresponse such as galvanic skin response, heart rate measurements, body temperature measurements, biometric data (e.g. voice recognition, fingerprint scanning, iris scanning, and the like), electromyography (EMG) data, electroencephalography (EEG) data, etc. The various bioresponse data can be combined for authentication purposes. For example, eye-tracking data can be combined with galvanic skin response data to determine elements of an authentication test that can generate user excitement.

Authentication tests can be utilized in a variety of applications such as with web pages and other digital documents (e.g. digital kiosks, digital billboards, etc.) to authenticate that a user is a human. Authentication tests can utilize personal information or preset instructions and user responses can be utilized as a personalized 'password' (e.g. personalized user verification). This 'password' can be varied according to randomly selected authentication tests content and instructions that take into account pre-provided personal user information and/or history (e.g. web browsing history, eye-tracking history, etc.). For example, a user can have eye-tracking data for a previous visit to a web page that indicated an interest in a particular image. Upon returning to the web page, an authentication test can be generated that shows the user a set of images that includes the image of interest. If the user again shows interest in the image, this can indicate that the image is to be utilized to authenticate the user. Instructions can be provided to cue the user to gaze at an image that was of interest during the previous visit.

An authentication server (not shown) can be utilized to generate and administer authentication tests (e.g. as described with regards to processes 100, 200, 300 and 600). The authentication server can include modules for obtaining relevant eye-tracking history data and/or associated images. The authentication server can include modules for algorithmically generating user authentication test for user-verification purposes. The authentication server can include modules that enable a user to create at least one personalized user-verification test and/or provide data that can be utilized to algorithmically generate personalized user-verification tests. In other embodiments, the operations of an authentication server can be performed (in whole or in part) by an authentication application in a local computing device.

Figure 3:
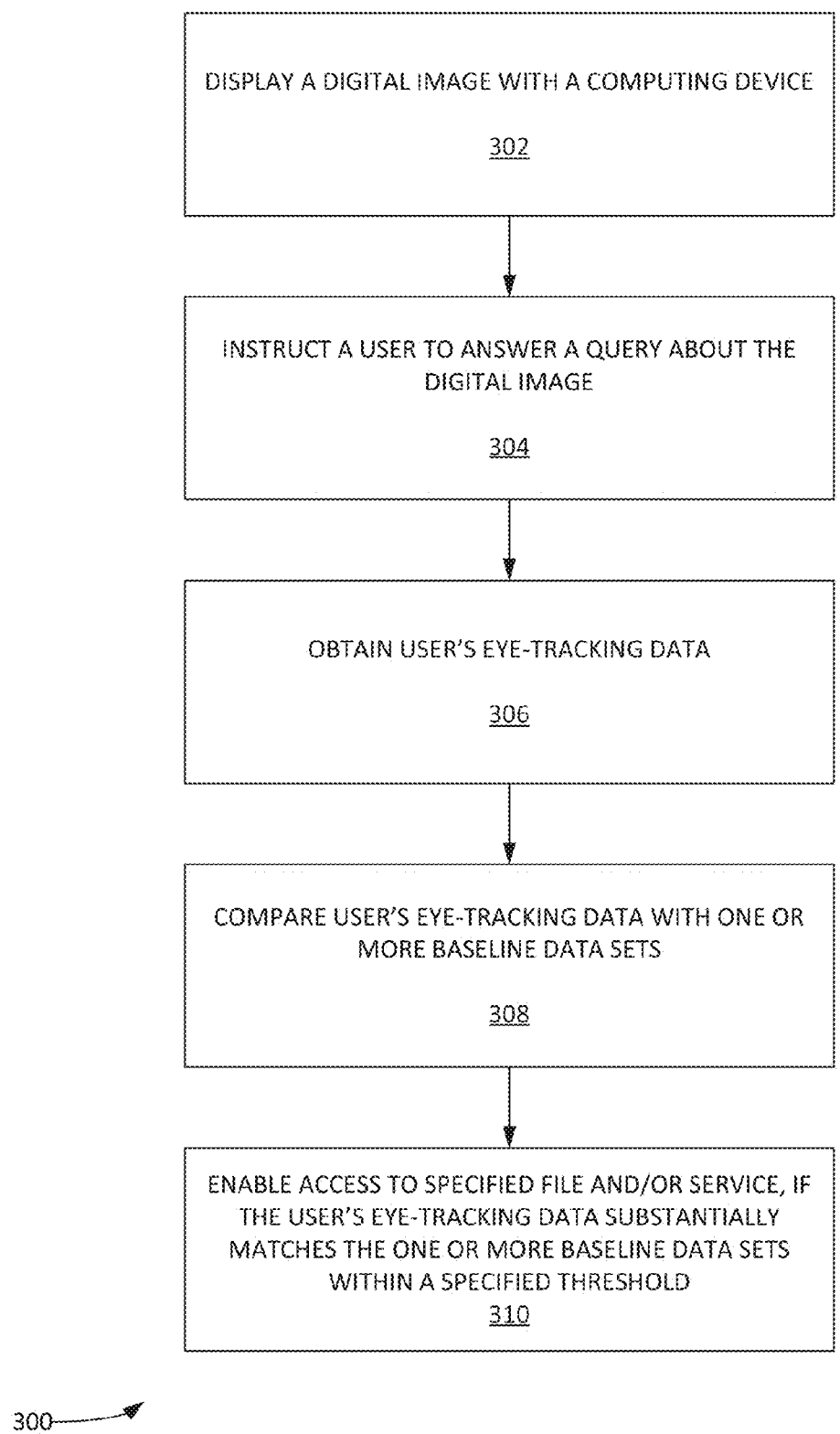
FIG. 3 illustrates an exemplary process for using eye-tracking data to determine that a response to a query is provided by a human, according to some embodiments.

FIG. 3 illustrates an exemplary process 300 for using eye-tracking data to determine that a response to a query is provided by a human, according to some embodiments. In step 302, a digital image is displayed with a computing device. For example, the digital image can be displayed on a laptop display, a smart phone touch screen, a digital billboard, and the like. The computing device can be any system with a processor, memory, and display coupled with an eye-tracking system (e.g. a lap top computer, a tablet computer, a smart phone, a smart appliance, an augmented reality head-mounted display, head-mounted computer, etc.). In step 304, a user is instructed to answer a query about the content of the digital image. The query can be chosen from a set of queries relevant to the digital image. In step 306, the eye-tracking data of the user (e.g. values of saccades, regressions, fixations, traces of eye scan, and the like) is obtained from the user while the user scans the digital image in order to determine an answer to the query. The eye-tracking data can be obtained for a set period of time once it is determined that the user has begun scanning the digital image (e.g. for first fifteen seconds, up to one minute, until the user inputs an answer into the query field, until the user looks away from the display and the like).

In step 308, the user's eye-tracking data is compared with one or more baseline data sets. This step can be performed in order to determine how relevant the user's eye-tracking data is to the content of the query. For example, the digital image can include a picture of a man. The query can be to input an estimated age of the man. Thus, the user's eye-tracking data should indicate an interest in regions of the digital image that provide information about the age of the man. The coordinate positions of these regions can be included in a baseline data set.

A baseline data set can be generated in various ways. For example, the regions of the digital image associated with query content can be pre-determined (e.g. set by a test designer, set by an image recognition application (e.g. with a computer vision algorithm), determined by previously administering the test to other users and averaging results, and the like). The coordinates of the region(s) can be determined according to the type of display utilized by the computing device. A threshold eye-tracking data value(s) can be set for the region. In one example, the threshold eye-tracking data value(s) for a region can be obtained from an aggregation of a set of past users eye-tracking data values for the same image and question. It is noted that these threshold values can be modified according to an accuracy goal of the challenge/response protocol. In another example, a system administrator and/or an algorithm can set the threshold values based on various metrics such as user demographics, profile information, historical eye-tracking data values, etc. For example, threshold values for a user with a history of scanning an image quicker than an average scan time can be lowered for future challenge/response tests. In another example, a particular image and query with a comparatively low pass rate can have an associated threshold value decreased automatically. Likewise, a particular image and query with a comparatively higher pass rate can have an associated threshold value increased automatically (e.g. more fixations required in a particular region).

It is further noted that the regions of the digital image associated with query content can be determined algorithmically. For example, a table can be generated that associates query terms with various possible image elements based on the content of the element. For example, a query that includes the terms 'age of' can be associated with elements such as faces, clothing, hair color and the like. If these elements are located in an image by an image recognition application, then the corresponding coordinates of the element can be set as a region of the digital image associated with query content. In this way, randomly selected digital images can be selected and presented extemporaneously from randomized image sources.

The user's eye-tracking data can also be parsed and compared to the coordinates of the display. It can be determined if the user's eye-tracking data values for a region of the digital image associated with query content have met the threshold value(s). In some examples, the user's eye-tracking data values can be required to satisfy the threshold values within a specified time period. If a threshold is met for the region(s) of interest, then the user can be said to have passed the test.

Thus, in step 310, access can be enabled for the user to a specified file and/or service (e.g. a web site, engage in an online transaction, post to a microblog, and the like) when the user's eye-tracking data matches the one or more baseline datasets within a specified threshold.

It is noted that images used in process 300 need not be separate from the native contents of a display (e.g. a web page, digital advertisement, and/or digital billboard). In this way, the image can be inherent in the display content. For example, if a user is interacting with a digital billboard, the image can be a portion of the digital-billboard display. A query can be automatically generated by obtaining information (e.g. from metadata, markup content, image recognition operation(s) and the like) about the portion of the digital-billboard display. In another example, the image can be randomly selected from a microblog feed. The microblog feed can include a timeline view showing microblog posts in reverse chronological order. Microblog posts can include associated images provided by users. A query can be automatically generated by obtaining information (e.g. from metadata, markup content, image recognition operation(s), definitions of text content and die like) about the portion of a randomly selected visible image. In another example use case, process 300 can be utilized to 'wake up' computing devices such as smart appliances that are in sleep/hibernate mode in order to minimize power consumption.

Moreover, in some embodiments, a process of using eye-tracking data to determine that a response to a query is provided by a human can be modified to include obtaining user eye-tracking data while the user interacts with a computer-generated display (e.g. without a query step). The eye-tracking data can then be analyzed (e.g. compared to baseline data sets of other human users and the like) to determine that the user is a person.

Challenge tests with eye-tracking data authentication of human user (e.g. processes 100, 200, 300 and 600) can be used in digital kiosks that display some form of advertising (e.g. in the form of a challenge question that conveys the advertiser's message). Successful authentication can provide a "green light or cue" to further interact with the user more deeply. The trigger for interacting with the user can occur when it is determined that the user is actively engaged with die media on the digital screen/billboard/kiosk through user eye patterns that match eye patterns expected by the advertiser. In another example, challenge-test with eye-tracking data authentication of human user can be utilized to determine a user is a person before posting a microblog post, social network status update and/or sending an email. Other scenarios include challenge-tests with eye-tracking data authentication of human user for e-Wallet transactions (e.g. using NFC) and/or online payment transactions.

Figure 4:
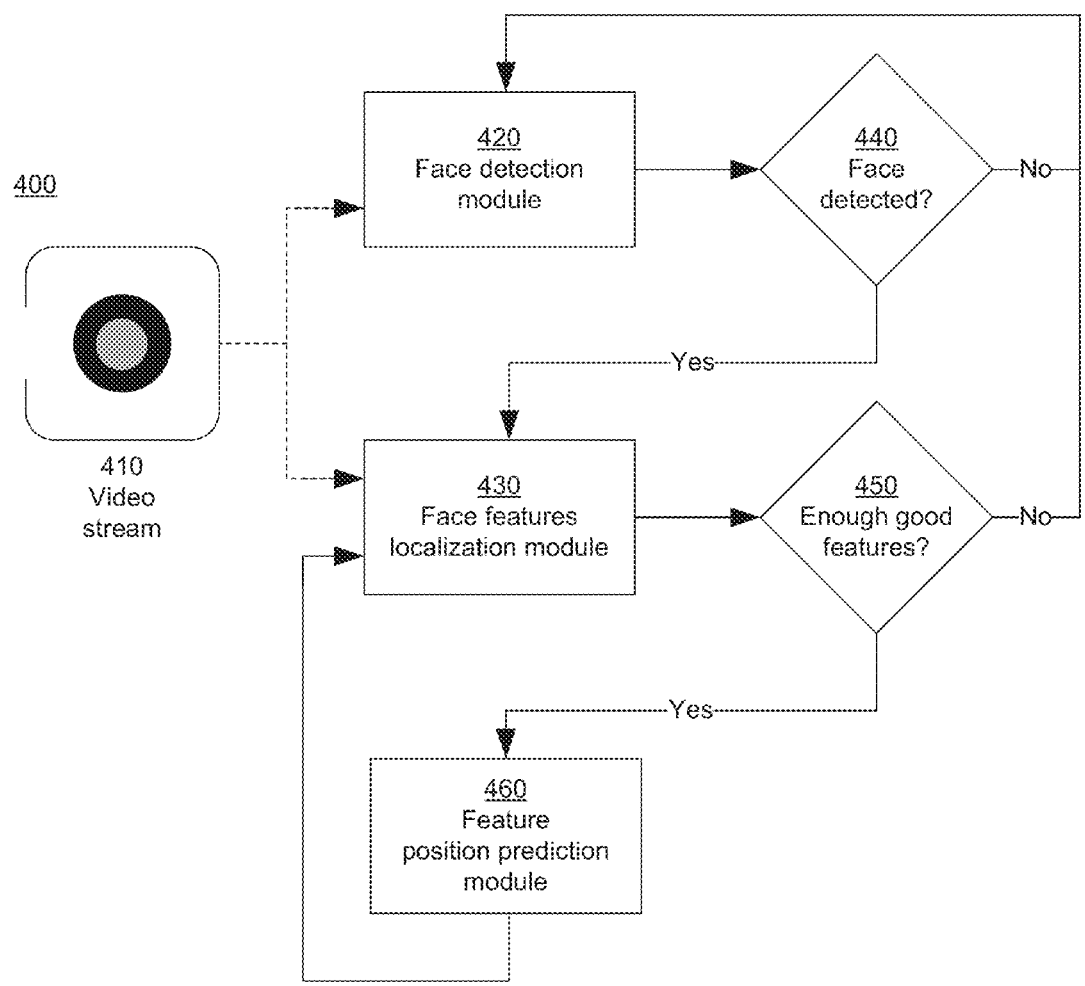
FIG. 4 illustrates exemplary components and an exemplary process for obtaining eye-tracking data according to one example embodiment.

FIG. 4 illustrates exemplary components and an exemplary process 400 for obtaining eye-tracking data. The gaze-tracking algorithm discussed above can be built upon three modules which interoperate to provide a fast and robust eyes- and face-tracking system. Data received from video stream 410 can be input into face detection module 420 and face feature localization module 430. Face detection module 420, at junction 440, can check whether a face is present in front of the camera, receiving video stream 410.

In the case that a face is present, face detection module 420 can determine a raw estimate of the 2D position in the image of the face and facial features (eyebrows, eyes, nostrils, and mouth) and provide the estimate to face features localization module 430. Face features localization module 430 can find the exact position of the features. When the feature positions are known, the 3D position and orientation of the face can be estimated. Gaze direction (e.g. gaze 560 of FIG. 5) can be processed by combining face orientation estimation and a raw estimate of eyeball orientation processed from the iris center position in the eyes.

If a face is not detected, control passes back to face detection module 420. If a face is detected but not enough facial features are detected to provide reliable data at junction 450, control similarly passes back to face detection module 420. Module 420 can try again after more data is received from video stream 410. Once enough good features have been detected at junction 450, control passes to feature position prediction module 460. Feature position prediction module 460 can process the position of each feature for the next frame. This estimate can be built using Kalman filtering on the 3D positions of each feature. The estimated 3D positions can then be back-projected to the 2D camera plane to predict the pixel positions of all the features. Then, these 2D positions can be sent to face features localization module 430 to help it process the next frame.

The eye-tracking method is not limited to this embodiment. Any eye-tracking method can be used. It can consist of a high-sensitivity black and white camera (using, for example, a Sony EX View HAD CCD chip), equipped with a simple NIR filter letting only NIR wavelengths pass and a set of IR-LEDs to produce a corneal reflection on the user's cornea. The IR-LEDs can be positioned below instead of beside the camera. This positioning avoids shadowing the opposite eye by the user's nose and thus supports the usage of reflections in both eyes. To test different distances between the camera and the user, the optical devices can be mounted on a rack. In some embodiments, only three of the nine IR-LEDs mounted on the rack are used, as they already provide sufficient light intensity to produce a reliably detectable reflection on the cornea. One example implementation of this embodiment uses the OpenCV library which is available for Windows™ and Linux platforms. Machine dependent parts can be encapsulated so that the program can be compiled and run on both systems.

When implemented using the OpenCV library, if no previous eye position from preceding frames is known, the input image can first be scanned for possible circles, using an appropriately adapted Hough algorithm. To speed up operation, an image of reduced size can be used in this step. In one embodiment, limiting the Hough parameters (for example, the radius) to a reasonable range provides additional speedup. Next, the detected candidates can be checked against further constraints like a suitable distance of the pupils and a realistic roll angle between them. If no matching pair of pupils is found, the image can be discarded. For successfully matched pairs of pupils, sub-images around the estimated pupil center can be extracted for further processing. In particular due to interlace effects, but also caused by other influences the pupil center coordinates, pupils found by the initial Hough algorithm cannot be sufficiently accurate for further processing. For exact calculation of gaze 560 direction, however, this coordinate should be as accurate as possible.

One possible approach for obtaining a usable pupil center estimation is actually finding the center of the pupil in an image. However, the invention is not limited to this embodiment. In another embodiment, for example, pupil center estimation can be accomplished by finding the center of the iris, or the like. While the iris provides a larger structure and thus higher stability for the estimation, it is often partly covered by the eyelid and thus not entirely visible. Also, its outer bound does not always have a high contrast to the surrounding parts of the image. The pupil, however, can be easily spotted as the darkest region of the (sub-) image.

Using the center of the Hough-circle as a base, the surrounding dark pixels can be collected to form the pupil region. The center of gravity for all pupil pixels can be calculated and considered to be the exact eye position. This value can also form the starting point for the next cycle. If the eyelids are detected to be closed during this step, the image can be discarded. The radius of the iris can now be estimated by looking for its outer bound. This radius can later limit the search area for glints. An additional sub-image can be extracted from the eye image, centered on the pupil center and slightly larger than the iris. This image can be checked for the corneal reflection using a simple pattern matching approach. If no reflection is found, the image can be discarded. Otherwise, the optical eye center can be estimated and the gaze direction can be calculated. It can then be intersected with the monitor plane to calculate the estimated viewing point. These calculations can be done for both eyes independently. The estimated viewing point can then be used for further processing. For instance, the estimated viewing point can be reported to the window management system of a user's device as mouse or screen coordinates, thus providing a way to connect the eye-tracking method discussed herein to existing software.

A user's device can also include other eye-tracking methods and systems such as those included and/or implied in the descriptions of the various eye-tracking operations described herein. In one embodiment, the eye-tracking system can include an external system (e.g., a Tobii® T60 XL eye tracker, Tobii® TX 300 eye tracker, Tobii® Glasses Eye Tracker, an eye-controlled computer, an embedded eye tracking system such as a Tobii® IS-1 Eye Tracker, augmented-reality glasses with an integrated eye-tracking system, glasses coupled with an eye-tracking system and/or other eye-tracking system) communicatively coupled (e.g., with a USB cable, with a short-range Wi-Fi connection, Bluetooth® or the like) with the device. In other embodiments, eye-tracking systems can be integrated into the device. For example, the eye-tracking system can be integrated as a user-facing camera with concomitant eye-tracking utilities installed in the device.

In one embodiment, the specification of the user-facing camera can be varied according to the resolution needed to differentiate the elements of a displayed message. For example, the sampling rate of the user-facing camera can be increased to accommodate a smaller display. Additionally, in some embodiments, more than one user-facing camera (e.g., binocular tracking) can be integrated into the device to acquire more than one eye-tracking sample. The user device can include image processing utilities necessary to integrate the images acquired by the user-facing camera and then map the eye direction and motion to the screen coordinates of the graphic element on the display. In some embodiments, the user device can also include a utility for synchronization of gaze data with data from other sources, e.g., accelerometers, gyroscopes, or the like. In some embodiments, the eye-tracking method and system can include other devices to assist in eye-tracking operations. For example, the user device can include a user-facing infrared source that can be reflected from the eye and sensed by an optical sensor such as a user-facing camera.

Figure 5:
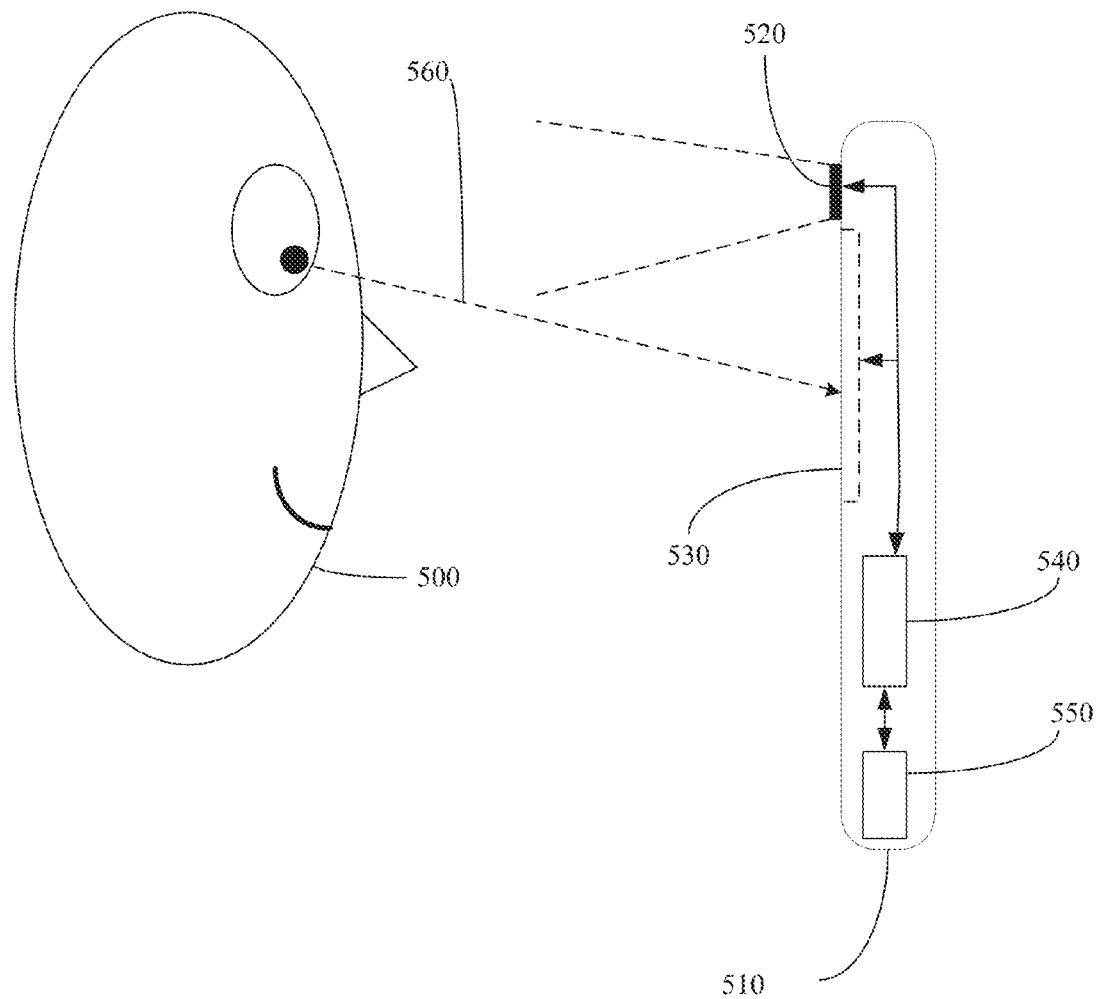
FIG. 5 illustrates one example of obtaining eye-tracking data from a user who is viewing a digital document, according to some embodiments.

FIG. 5 illustrates one example of obtaining eye-tracking data from a user
who is viewing a digital document, according to some embodiments. In this embodiment, eye-tracking module 540 of user device 510 tracks the gaze 560 of user 500. Although illustrated here as a generic user device 510, the device can be a cellular telephone, personal digital assistant, tablet computer (such as an iPad®), laptop computer, desktop computer, or the like. Eye-tracking module 540 can utilize information from at least one digital camera 520 and/or an accelerometer 550 (or similar device that provides positional information of user device 510) to track the user's gaze 560. Eye-tracking module 540 can map eye-tracking data to information presented on display 530. For example, coordinates of display information can be obtained from a graphical user interface (GUI). Various eye-tracking algorithms and methodologies (such as those described herein) can be utilized to implement the example shown in FIG. 5.

In some embodiments, eye-tracking module 540 can utilize an eye-tracking method to acquire the eye movement pattern. In one embodiment, an example eye-tracking method can include an analytical gaze estimation algorithm that employs the estimation of the visual direction directly from selected eye features such as irises, eye corners, eyelids, or the like to compute a gaze 560 direction. If the positions of any two points of the nodal point, the fovea, the eyeball center or the pupil center can be estimated, the visual direction can be determined.

In addition, a light can be included on the front side of user device 510 to assist detection of any points hidden in the eyeball. Moreover, the eyeball center can be estimated from other viewable facial features indirectly. In one embodiment, the method can model an eyeball as a sphere and hold the distances from the eyeball center to the two eye corners to be a known constant. For example, the distance can be fixed to 13 mm. The eye corners can be located (for example, by using a binocular stereo system) and used to determine the eyeball center. In one exemplary embodiment, the iris boundaries can be modeled as circles in the image using a Hough transformation.

The center of the circular iris boundary can then be used as the pupil center. In other embodiments, a high-resolution camera and other image processing tools can be used to detect the pupil. It should be noted that, in some embodiments, eye-tracking module 540 can utilize one or more eye-tracking methods in combination. Other exemplary eye-tracking methods include: a 2D eye-tracking algorithm using a single camera and Purkinje image, a real-time eye-tracking algorithm with head movement compensation, a real-time implementation of a method to estimate gaze 560 direction using stereo vision, a free head motion remote eyes (REGT) technique, or the like. Additionally, any combination of any of these methods can be used.

It is noted that eye-tracking data can be obtained substantially simultaneously and matched with a media content element. For example, a user's eye-tracking data that relates to a media content element can be obtained. The eye-tracking data can be timestamped. The eye-tracking data can indicate a user's attention span for a period of time. Substantially simultaneously, other bioresponse data can be obtained from the user and tracked with the eye-tracking data. In this way, the other bioresponse data can be associated with various regions of the digital image as well. Thus, in some embodiments, other bioresponse data types can be combined with eye-tracking data in lieu of eye-tracking data alone. For example, process 100 can be modified to include a combination of eye-tracking data and one or more corresponding bioresponse data types (as obtained by biosensors coupled with the computing device). Accordingly, a composite data set (e.g. eye tracking plus at least one other bioresponse data type) can be obtained from a user after the query is posed. Additionally, the baseline data sets used for comparison purposes to indicate user interest in various relevant regions of the digital image can also include composite data. sets. Moreover, in some embodiments, a multimedia content (e.g. video plus music) can be utilized in lieu of a static digital image and a composite data set provided by sensors obtaining user bioresponse data as a function of time can be compared with composite baseline data sets that include a time variable.

Figure 6:
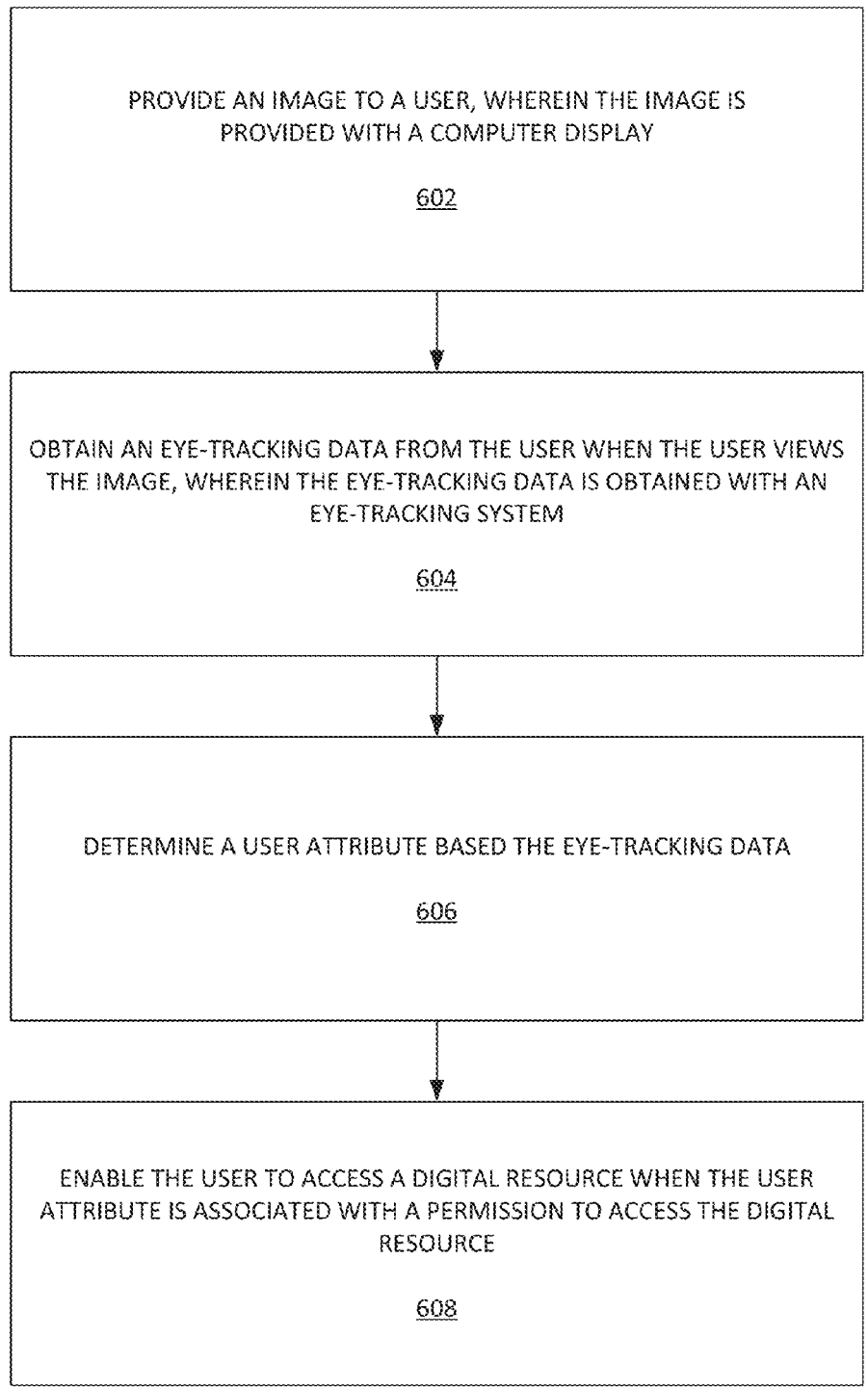
FIG. 6 illustrates yet another exemplary process for authentication of a user using eye-tracking data, according to some embodiments.

FIG. 6 illustrates yet another exemplary process 600 for authentication of a user using eye-tracking data, according to some embodiments. In step 602 of process 600, an image is displayed to a user. The image can be provided with a computer display. The image can be a computer icon, a region of the computer display, a digital photograph, a video, text, a Captcha image, etc. In step 604, eye-tracking data is obtained from the user when the user views the image. The eye-tracking data can be obtained with an eye-tracking system. In step 606, a user attribute is determined based on the eye-tracking data. Example user attributes that can be determined with eye-tracking data include, inter alia: whether the user is a person (e.g. not an internet bot); whether the user has permission to access a resource such as a digital document, an operation of a computing system (e.g. unlocking a door, turning on a vehicle, accessing a television channel, etc.) and/or mode of a computing device; an identity of a user; and/or a demographic/cultural characteristic of a user. For example, an identity of a user can authenticated by requesting the user perform a gaze pattern with regards to one or more icons that is known (e.g. preset) by the user. In another example, a demographic/cultural characteristic of a user can be determined by presenting an image(s) to a user and then comparing the user's eye-tracking data while viewing the image with pre-obtained eye-tracking data sets of various demographic/cultural groups. In step 608, the user can be enabled to access a digital resource when the user attribute is associated with a permission to access the digital resource. In one example, associations can be implemented with tables that match user attributes (e.g. a user's identity, a user's authenticated state, etc.) with a particular digital resource. It is noted that in some embodiments, eye-tracking data can be combined with other bioresponse data (e.g. galvanic skin response (GSR), heart rate, etc.) to determine an attribute of a user. For example, both eye-tracking data and a user's heart rate can be utilized to determine a user attribute. Various types of bioresponse sensors can be utilized to obtain the bioresponse data (e.g. digital imaging processes that provide information as to user's body temperature and/or heart rate, heat-rate monitors, body temperature sensors, GSR sensors, brain-computer interfaces such as an Emotiv®, a Neurosky BCI® and/or another electroencephalographic system, ascertaining a user's bioimpedance value, iris scanners, fingerprint scanners, other biometric sensors and the like).

Figure 7A:
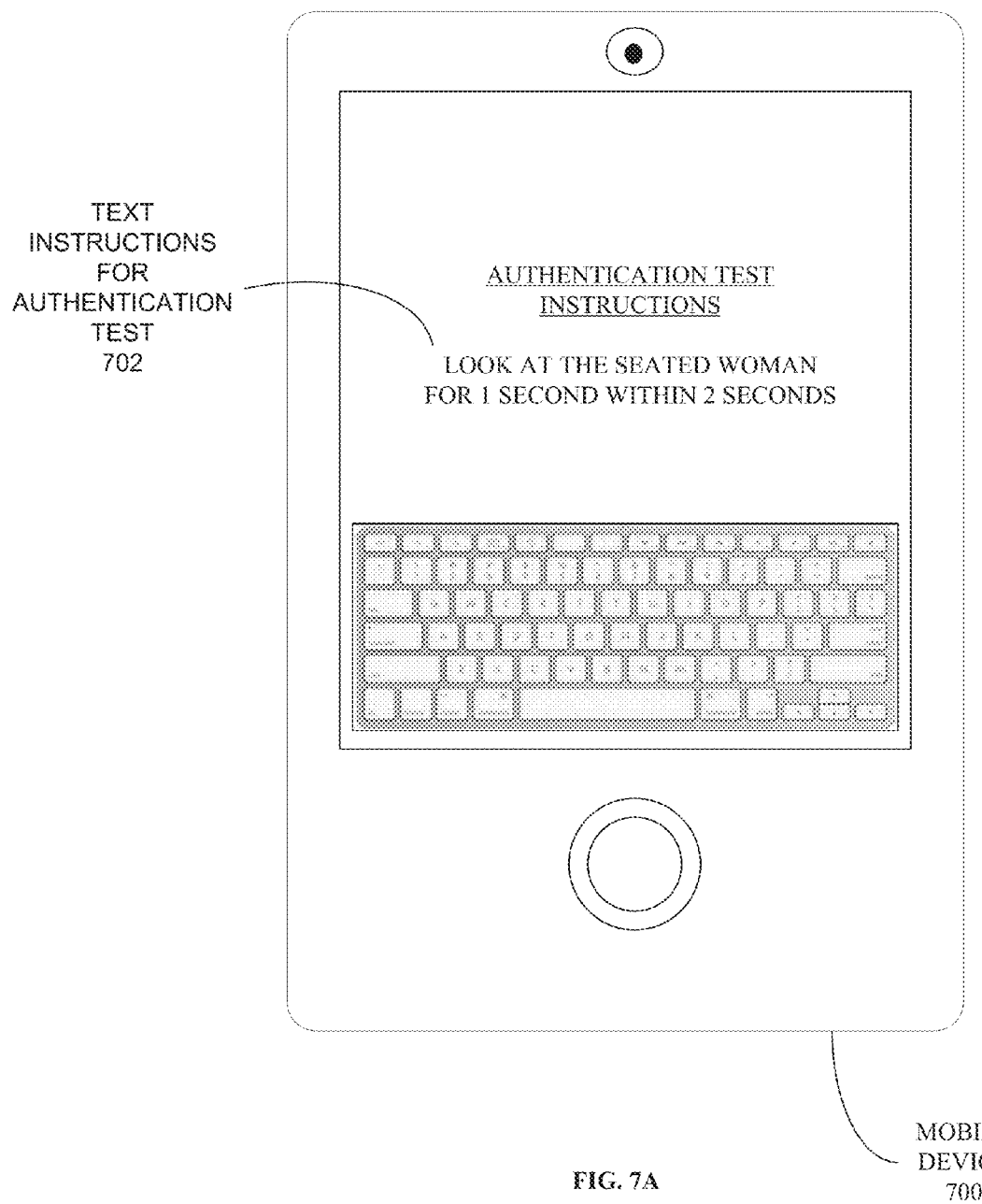
FIG. 7A illustrates an example of a graphical user interface displaying an instruction to a user in text format as to how to correctly complete an authentication operation, according to some embodiments.

FIG. 7A illustrates an example of a graphical user interface of a mobile device 700 displaying an instruction 702 to a user in text format as to how to correctly complete an authentication operation, according to some embodiments. In other examples, instruction 702 can be by way of a visual example (e.g. a child window with a video example) rather than a text instruction. In some embodiments, the authentication operation can include other steps such as those already used in many multi-factor authentication operations in addition to the eye-tracking data authentication step (e.g. inputting a username and password, performing a passmap, other user actions such as touching the touching screen in a specified pattern, other eye movements such as blinking a certain number of times, moving the mobile device in a particular pattern, etc.). Instructions relating to these other authentication operations can also be included in the display as well. Authentication instructions 702 can be provided on a periodic basis and/or according to other parameters such as when requested by a user. It should be noted that in some embodiments, icons cannot be utilized and the instructions can be to look at a particular region of the display, perform a certain eye-motion pattern relative to one or more regions of the display, eye gazes upon a series of specified icons with a provided time parameter and/or the like. The authentication test can include various parameters which can be modified according to such factors as authorized user input, authorized third-party parameters and the like.

Figure 7B:
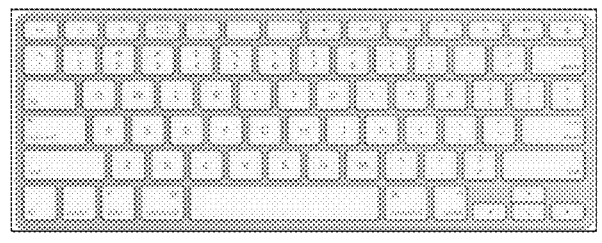
FIG. 7B illustrates an example of a graphical user interface of a mobile device displaying an instruction to a user in text format as to how to correctly complete another authentication operation, according to some embodiments.
Figure 7B:
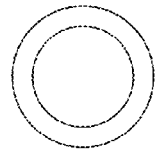
Figure 8:
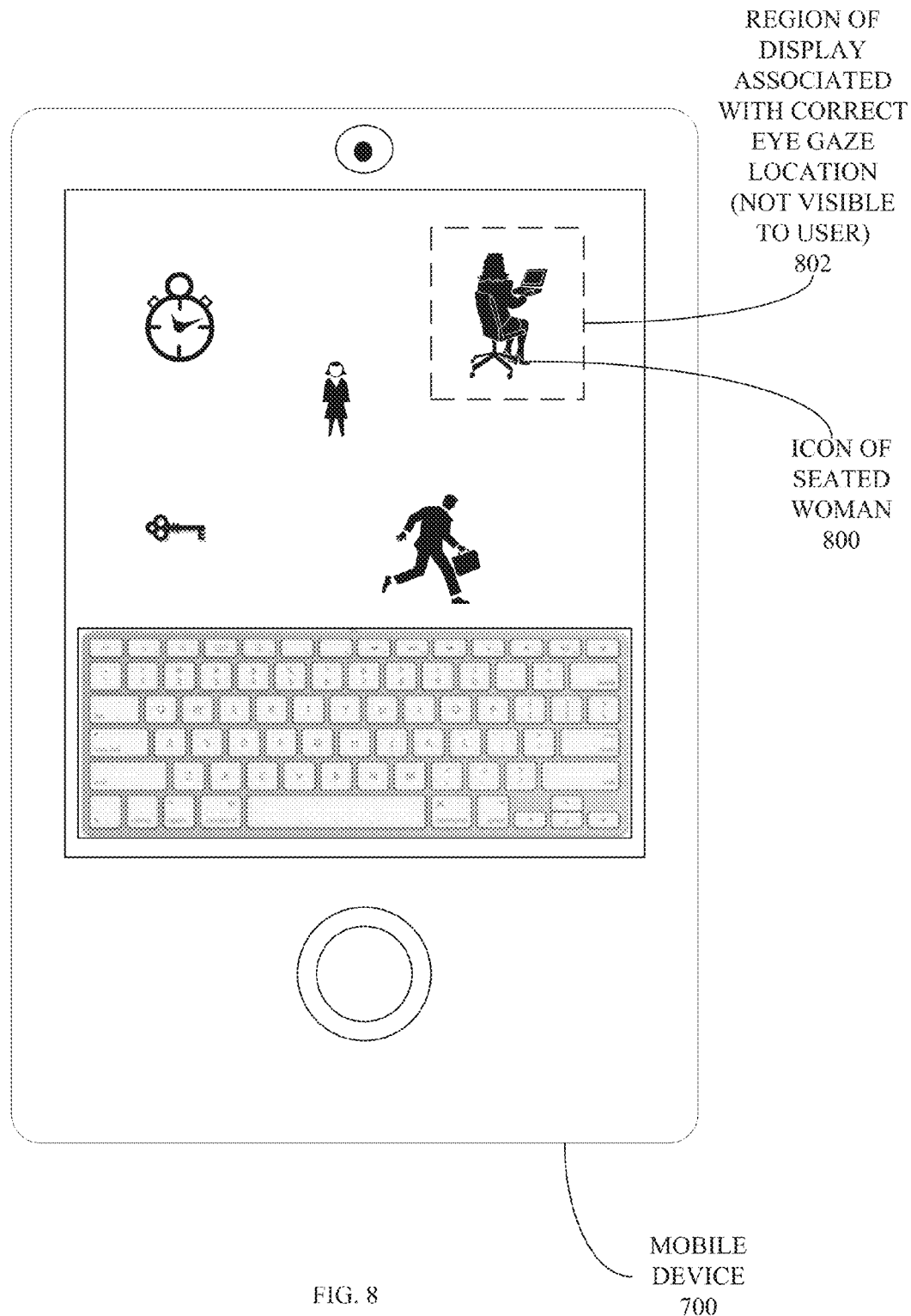
FIG. 8 illustrates an example of a graphical user interface displaying an authentication test, according to some embodiments.

FIG. 7B illustrates another example of a graphical user interface of a mobile device 700 displaying an instruction 704 to a user in text format as to how to correctly complete another type of authentication operation, according to some embodiments. A user-authentication process such as process 300 can then be implemented when the image(s) related to instruction 704 are displayed (e.g. as shown in FIG. 8). In the present example, instruction 704 requests that the user answer a question: "What is the seated woman doing". The display of FIG. 8 can then be provided and the user's eye-tracking data collected while the user gathers information to answer the query in instruction 704. This eye-tracking data can be compared to other data sets previously obtained from other users. A user can be authenticated as a human user if the user's eye-tracking data is within a specified threshold of the other user data sets. For example, a heat map of the user's eye-tracking data can indicate that region 802 was of greatest interest to the user as it includes the icon seated woman 800. In various embodiments, the user may or may not be provided an opportunity to input an answer to the query with a voice and/or text input description of the activity of the seated woman.

FIG. 8 illustrates an example of a graphical user interface of mobile device 700 displaying an authentication test, according to some embodiments. For example, a user can use instructions 702 provided in FIG. 7A to correctly complete the authentication operation. The authentication test can be provided on a periodic basis and/or according to other parameters such as when a facial recognition algorithm detects another user and/or if a user attempts to access a specified state, mode or operation of the mobile device (or in other examples a computing device). The sizes, shapes and other attributes of the visual elements and region of the display associated with correct eye-gaze location 802 can be adjusted according to the parameters of the display and the device upon which the authentication test is implemented. In one example, if a user's eye-tracking data indicated that the user gazed at the key during a period provided for the authentication test, the user would fail the authentication test. If the user followed the previously provided instructions, the user's eye-tracking data indicates that the user looked at the region 802 associated with the seated woman icon 800 for one second within two seconds of the display of the test image, and then the user can be deemed to have passed the authentication test. It is noted that the embodiments are not limited by this illustrative example. Accordingly, in another example, a user can use instructions 704 provided in FIG. 7B to correctly complete the authentication operation (see supra).

B. Additional Environment and Architecture

Figure 9:
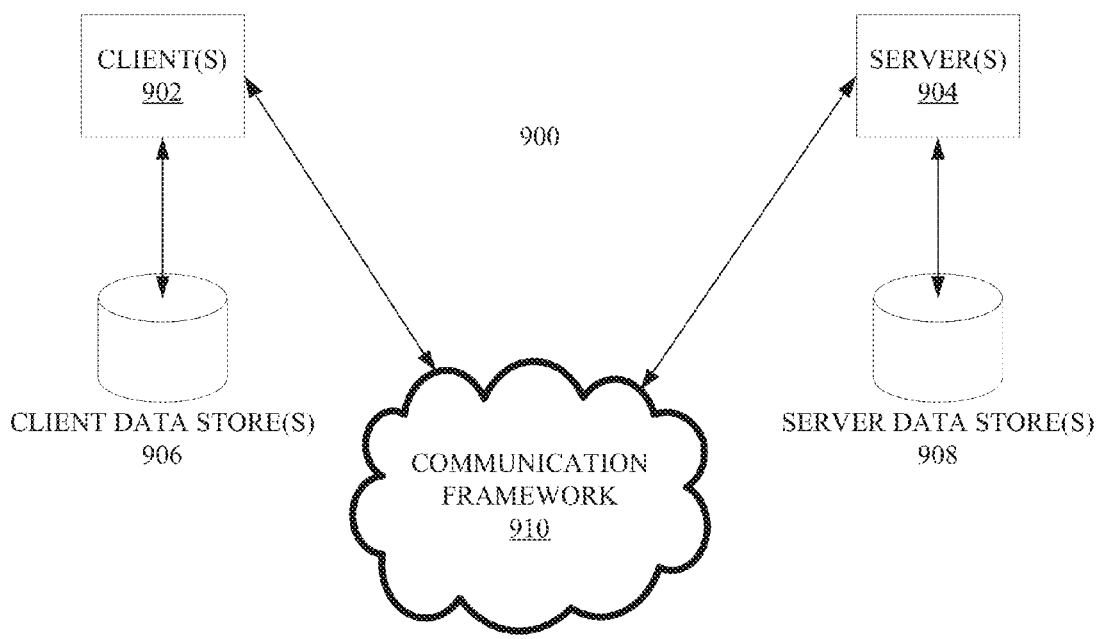
FIG. 9 depicts an exemplary computing system that can be configured to perform any one of the processes provided herein.

FIG. 9 is a block diagram of a sample computing environment 900 that can be utilized to implement some embodiments. The system 900 further illustrates a system that includes one or more client(s) 902. The client(s) 902 can be hardware and/or software (e.g., threads, processes, computing devices). The system 900 also includes one or more server(s) 904. The server(s) 904 can also be hardware and/or software (e.g., threads, processes, computing devices). One possible communication between a client 902 and a server 904 can be in the form of a data packet adapted to be transmitted between two or more computer processes. The system 900 includes a communication framework 910 that can be employed to facilitate communications between the client(s) 902 and the server(s) 904. The client(s) 902 are connected to one or more client data store(s) 906 that can be employed to store information local to the client(s) 902. Similarly, the server(s) 904 are connected to one or more server data store(s) 908 that can be employed to store information accessible by the server(s) 904. In some embodiments, system 900 can be included and/or be utilized by the various systems and/or methods described herein. System 900 can be implemented in cloud computing environment. System 900 can include an eye-tracking system and/or other biosensors.

Figure 10:
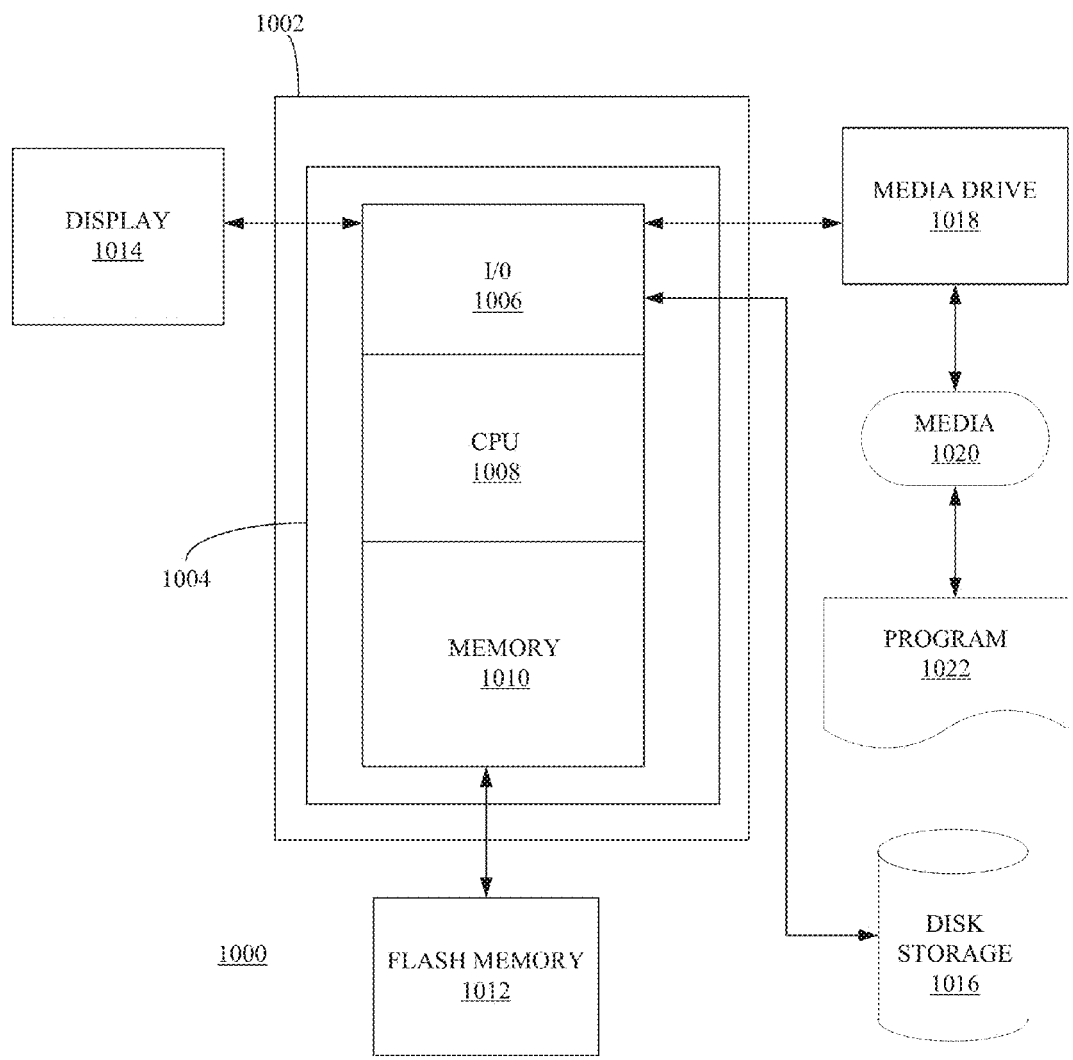
FIG. 10 depicts a computing system with a number of components that can be used to perform any of the processes described herein.

FIG. 10 depicts an exemplary computing system 1000 that can be configured to perform any one of the processes provided herein. In this context, computing system 1000 can include, for example, a processor, memory, storage, and I/O devices (e.g., monitor, keyboard, disk drive, Internet connection, etc.). However, computing system 1000 can include circuitry or other specialized hardware for carrying out some or all aspects of the processes. In some operational settings, computing system 1000 can be configured as a system that includes one or more units, each of which is configured to carry out some aspects of the processes either in software, hardware, or some combination thereof.

FIG. 10 depicts a computing system 1000 with a number of components that can be used to perform any of the processes described herein. The main system 1002 includes a motherboard 1004 having an I/O section 1006, one or more central processing units (CPU) 1008, and a memory section 1010, which can have a flash memory card 1012 related to it. The I/O section 1006 can be connected to a display 1014, a keyboard and/or other attendee input (not shown), a disk storage unit 1016, and a media drive unit 1018. The media drive unit 1018 can read/write a computer-readable medium 1020, which can include programs 1022 and/or data. Computing system 1000 can include a web browser. Moreover, it is noted that computing system 1000 can be configured to include additional systems in order to fulfill various functionalities. Display 1014 can include a touch-screen system and/or sensors for obtaining contact-patch attributes from a touch event. In some embodiments, system 1000 can be included and/or be utilized by the various systems and/or methods described herein.

At least some values based on the results of the above-described processes can be saved for subsequent use. Additionally, a computer-readable medium can be used to store (e.g., tangibly embody) one or more computer programs for performing any one of the above-described processes by means of a computer. The computer program can be written, for example, in a general-purpose programming language (e.g., Pascal, C, C++, Java, and/or Python) and/or some specialized application-specific language (PHP, Java Script, XML).

C. Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method comprising:
   displaying a digital image with a computing device;
   instructing a user to answer a query about the digital image;
   receiving a user's eye-tracking data for a period that the user views the digital image;
   comparing the user's eye-tracking data with one or more baseline datasets;
   receiving a user's bioresponse data for the period that the user views the digital image, wherein the user's bioresponse data for the period that the user's heart rate, wherein the one or more baseline datasets comprises an eye-tracking pattern associated with the query and a specified heart-rate threshold, and wherein the eye-tracking pattern associated with the query comprises an average of eye-tracking patterns from other users vis-à-vis the digital image as a response to the query; and
   providing a file or a service to the user when the user's eye-tracking data substantially matches the one or more baseline datasets.

2. The method of claim 1 further comprising:
   comparing the user's eye-tracking data and the user's bioresponse data with the one or more baseline datasets; and
   providing the file or the service to the user when the user's eye-tracking data and the user's bioresponse data substantially matches the one or more baseline datasets.

3. A method of authenticating a user comprising:
   instructing the user to view a visual element on a display of a mobile device;
   presenting the visual element with the display;
   tracking a user's gaze with an eye-tracking system when the visual element is presented;
   comparing the user's gaze with one or more baseline datasets;
   receiving a user's bioresponse data for a period that the user gazes at the visual element, wherein the user's bioresponse data comprises a user's heart rate, wherein the one or more baseline datasets comprises an eye-tracking pattern associated with the instruction and a specified heart-rate threshold, and wherein the eye-tracking pattern associated with the instruction comprises an average of eye-tracking patterns from other users vis-à-vis the visual element as a response to the instruction; and
   determining when the user's gaze satisfies the instruction.

4. The method of claim 3, wherein the user is instructed to view the visual element for a specified period, 5. The method of claim 3 further comprising:
   performing a mobile device operation when the user's gaze satisfies the instruction.

* * * * *